United States Patent [19]

Ake

[11] Patent Number: 5,000,564
[45] Date of Patent: Mar. 19, 1991

[54] LASER BEAM MEASUREMENT SYSTEM
[75] Inventor: DuWain K. Ake, Tipp City, Ohio
[73] Assignee: Spectra-Physics, Inc., San Jose, Calif.
[21] Appl. No.: 491,227
[22] Filed: Mar. 9, 1990
[51] Int. Cl.$^5$ .......................... G01C 3/00; G01C 3/08; G01B 11/26
[52] U.S. Cl. .......................................... 356/1; 356/4; 356/141; 356/152; 172/4.5
[58] Field of Search ....................... 356/1, 4, 141, 152, 356/375; 172/4.5

[56]  References Cited
U.S. PATENT DOCUMENTS

| | | |
|---|---|---|
| 2,830,487 | 4/1958 | Griffith ................................. 356/1 |
| 3,588,249 | 6/1972 | Studebaker . |
| 3,680,958 | 8/1972 | Von Bose . |
| 3,687,556 | 8/1972 | Price et al. ......................... 356/152 |
| 3,813,171 | 5/1974 | Teach et al. . |
| 3,873,226 | 3/1975 | Teach . |
| 3,997,071 | 12/1976 | Teach . |
| 4,029,415 | 6/1977 | Johnson ................................. 356/4 |
| 4,030,832 | 6/1977 | Raudo et al. . |
| 4,034,490 | 7/1977 | Teach . |
| 4,830,489 | 5/1989 | Cain et al. . |
| 4,895,440 | 1/1990 | Cain et al. ............................. 356/4 |
| 4,912,643 | 3/1990 | Beirxe ................................... 356/1 |
| 4,936,678 | 6/1990 | Gordon et al. ........................ 356/4 |

Primary Examiner—Stephen C. Buczinski
Attorney, Agent, or Firm—Killworth, Gottman, Hagan & Schaeff

[57] ABSTRACT

A laser beam three dimensional position measurement system includes a laser transmitter mounted at a stationary reference position at a work site and a receiver mounted on a mobile machine at the site. The transmitter produces a laser reference plane by sweeping a laser beam about the transmitter. The receiver includes two spaced apart laser beam detectors for measuring the horizontal angle of the incoming beam with respect to the face of the receiver at two spaced apart locations on the face of the receiver. The horizontal angles are used to determine the range of the receiver from the transmitter. The transmitter includes an azimuth device for providing signals to the receiver indicative of the azimuth angle at which the receiver is positioned with respect to a reference axis that extends from the transmitter. The receiver includes a decoder signal receiving device for receiving the angle signals from the transmitter in order to determine its azimuth angle.

20 Claims, 9 Drawing Sheets

LASER BEAM MEASUREMENT SYSTEM

CROSS REFERENCE TO RELATED APPLICATION

Reference is hereby made to the following co-pending application, dealing with related subject matter and assigned to the assignee of the present invention: "Laser-based Measurement System," by Cain et al, assigned U.S. Ser. No. 234,565 and filed Aug. 22, 1988.

BACKGROUND OF THE INVENTION

The present invention generally relates to laser-based systems useful in construction applications and, more particularly, to a laser-based system for measuring the position of a receiver, mounted on mobile construction equipment operating at a work site, with respect to a transmitter located at a stationary reference position at the work site. The position of the receiver is determined in three dimensions by the system.

In prior laser-based systems, such as that disclosed in U.S. Pat. No. 3,588,249, for example, a reference plane is established throughout a work site by a transmitter which emits laser energy in a level reference plane. The reference plane is typically established by a laser beam which is projected radially outward from the transmitter and rotated continuously through 360 degrees to sweep around the entire work site. One or more receivers may be employed throughout the work site to sense the location of this reference plane. Such receivers may be mounted on a surveyor rod as described in U.S. Pat. No. 4,030,832, or they may be employed as part of a control system for construction or agricultural equipment as described in U.S. Pat. Nos. 3,813,171; 3,873,226; 3,997,071; and 4,034,490.

Prior laser systems have provided an indication of elevation throughout the work site, but they have not typically indicated the position of the receiver within the work site. Thus, for example, the height of the blade on a road grader with respect to the reference plane can be measured by such prior systems, but if this height is to vary over the work site it is necessary for the operator to determine by some other means where the road grader is located within the site in order to know precisely what the elevation should be at that location. In other words, prior laser systems provide only one dimension of position information, that being elevation.

The laser survey system disclosed in U.S. Pat. No. 4,830,489 provides not only elevation information, but also position information in two other axes. The system includes a laser transmitter, located at a reference position at a work site, which sweeps a laser beam radially in a reference plane. The system includes a receiver, located on mobile earthmoving equipment operating at the work site, which has a sensor that determines the relative elevation of the laser reference plane. The receiver also includes a pair of reflectors, each of which reflects laser energy back to the transmitter. The laser transmitter has a sensor which receives the reflected laser energy, and, in response thereto, produces receiver position information for transmission to the receiver.

The laser transmitter is designed to rotate the laser beam continuously through 360 degrees at a substantially constant angular velocity and thus sweep the beam past the two reflectors of the receiver once during each revolution. During each revolution of the laser beam, the transmitter receives back two short bursts or pulses of laser energy from the two reflectors. Thus, since the laser beam sweeps at a substantially constant angular velocity and the distance between the reflectors is fixed, the time period between receipt of these two pulses provides an accurate basis for the calculation of the range, or distance of the receiver from the transmitter. Since the accuracy of the range calculation is dependent upon a uniform rotational velocity for the laser beam, any variability in the rotational velocity will decrease the accuracy of the range calculation.

The laser survey system disclosed in the above cross-referenced patent application likewise provides not only elevation information, but also position information in two other axes. The system includes a laser transmitter located at a reference position at a work site, which sweeps a laser beam radially in a reference plane. The system includes a receiver, located on mobile earth moving equipment operating at the work site, which has a sensor that determines the relative elevation of the laser reference plane. The receiver also includes a pair of vertically-oriented retroreflectors, at least one of which will reflect laser energy back to the transmitter. The laser transmitter has a sensor for sensing laser beam energy reflected back to the transmitter from the receiver, a timer for momentarily shutting off the laser beam after the reflected laser beam has been sensed and a counter for producing an electrical signal related to the time period it takes the laser beam to travel from the transmitter to one of the retroreflectors and then back to the transmitter. The transmitter takes this time period, which is directly proportional to the range of the receiver from the transmitter, and produces receiver position information for transmission to the receiver. The position angle of the receiver with respect to a reference axis is also determined by employing a shaft angle encoder. The encoder is coupled to rotate with the laser beam so that the position angle of the receiver may be read from the encoder when a reflected light pulse is received by the transmitter from the receiver.

It is apparent that the transmitter must receive and sense reflected laser energy from the receiver in order to determine both the range of the receiver from the transmitter and the angular position of the receiver from the reference axis. Since the transmitter must respond to reflected laser energy in order to determine the range and angular position of the receiver, the number of receivers which can be serviced by a transmitter is limited.

While the noted three dimensional measurement systems are substantial improvements over the prior art, alternative approaches for determining both the range of the receiver from the transmitter and the angular position of the receiver are needed to advance the state of the art and to offer additional options to those working in the construction industry. An approach is desired in which both the range and the angular position of the receiver may be determined without the transmitter having to receive and respond to laser energy reflected from the receiver.

SUMMARY OF THE INVENTION

This need is met by the laser beam three dimensional measurement system of the present invention wherein the range of the receiver from the transmitter and the angular position of the receiver are determined by the receiver without interaction with the transmitter. Receiver range is determined trigonometrically based on measuring the incident angle of the laser beam at two locations on the receiver. The angular position of a receiver is determined at the receiver by noting the laser beam angular position when it strikes the receiver. The laser beam angular position is determined by the transmitter and continuously transmitted such that the receiver need only receive the current angular position signal when the laser beam is detected by the receiver. The angular position signals can be modulated onto the laser beam directly, transmitted via an omnidirectional radio signal or otherwise transmitted from the transmitter to one or more receivers in a work site. Thus, a receiver may determine its three-dimensional position autonomously without the transmitter having to receive and respond to laser energy reflected from the receiver.

In accordance with one aspect of the present invention, a laser beam measurement system comprises first transmitter means located at a first position for producing a laser reference plane by sweeping a laser beam about the first transmitter means and a first receiver means located at a second position having a face for receiving the sweeping laser beam. The first receiver means includes two spaced apart laser beam detector means for measuring the horizontal angle of the incoming beam with respect to the face of the first receiver means at two spaced apart locations on the face of the first receiver means. The horizontal angle measurements are indicative of the range of the first receiver means from the transmitter means.

Each of the laser beam detector means comprises light detecting array means for determining the position of the laser beam as the laser beam strikes the light detecting array means to thereby provide an indication of the measurement of the horizontal angle of the laser beam with respect to the face of the first receiver means. The light detecting array means may comprise a charge-coupled device (CCD) array. Each of the laser beam detector means further comprises a first lens means for gathering and focusing the laser beam onto the light detecting array means and a cylindrical lens means for converting the laser beam passing through the first lens means into a laser beam plane which extends vertically onto the light detecting array means. Each of the laser beam detector means may further include filtering means for blocking extraneous light while allowing the laser beam to pass therethrough.

The first receiver means may include height sensing means for sensing the vertical position of the receiver means with respect to the reference plane. Preferably, the first transmitter means includes azimuth means for continuously transmitting angle signals indicative of an azimuth angle at which the first receiver means is positioned with respect to a reference axis that extends from the first transmitter means. The azimuth means comprises angle encoder means for generating the angle signals.

In a first embodiment, the azimuth means may include a radio transmitter for transmitting the angle signals to the first receiver means. Alternatively, in a second embodiment, the azimuth means may include means for modulating the laser beam to thereby transmit the angle signals by way of the laser beam to the first receiver means. The first receiver means may include angle decoder means for receiving the angle signals from the azimuth means in order to determine the azimuth angle.

The first receiver means may further comprise orientation means for maintaining the first receiver means in proper orientation with respect to the first transmitter means. The orientation means employs the angle measurements from each of the laser beam detector means for determining the orientation of the first receiver means to thereby direct the face of the first receiver means toward the first transmitter means.

In accordance with another aspect of the present invention, a laser beam measurement system comprises transmitter means located at a first position for producing a predetermined laser reference plane by sweeping a laser beam about the transmitter means, receiver means located at a second position and having a face for receiving the sweeping laser beam, and processor means for determining the range of the receiver means from the transmitter means. The receiver means includes two laser beam detector means spaced apart by a predetermined distance for measuring the horizontal angle of the incoming beam with respect to the face of the receiver means at two spaced apart locations on the face of the receiver means. The processor means determines the range of the receiver means from the transmitter means by utilizing the angle measurements from the two laser beam detector means and the predetermined distance therebetween.

The processor means calculates the range of the receiver means from the transmitter means by repetitively solving the following equation:

$$R = \frac{l\sqrt{4f^2 + P_2^2 - 2P_1P_2 + P_1^2}}{2(P_1 + P_2)}$$

wherein R is the range of the receiver means from the transmitter means, l is the predetermined distance between the two spaced apart laser beam detector means, f is the distance between the first lens and the light detecting array means, $P_1$ is the position where the laser beam strikes the light detecting array means of one of the two laser beam detector means and $P_2$ is the position where the laser beam strikes the light detecting array means of the other of the two laser beam detector means.

Accordingly, it is an object of this invention to provide an improved laser beam measurement system wherein the range of the receiver from the transmitter and the angular position of the receiver are determined at the receiver without the transmitter having to receive and respond to laser energy reflected from the receiver. Other objects and advantages of the invention will be apparent from the following description, the accompanying drawings and the appended claims.

DETAILED DESCRIPTION OF THE PREFERRED EMBODIMENT

Figure 1:
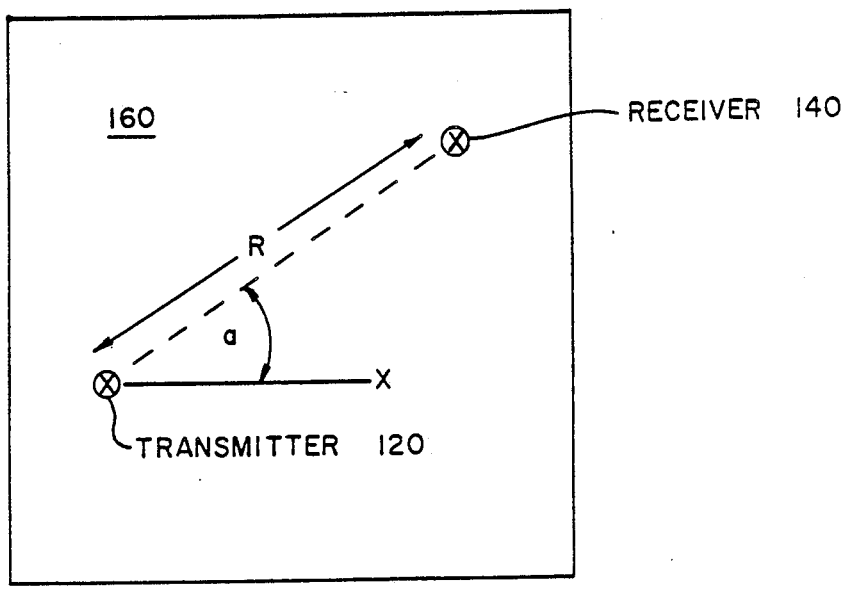
FIG. 1 is a diagrammatic representation of a work site with a transmitter and a receiver of the laser-based position measurement system of the present invention being located therein.
Figure 2:
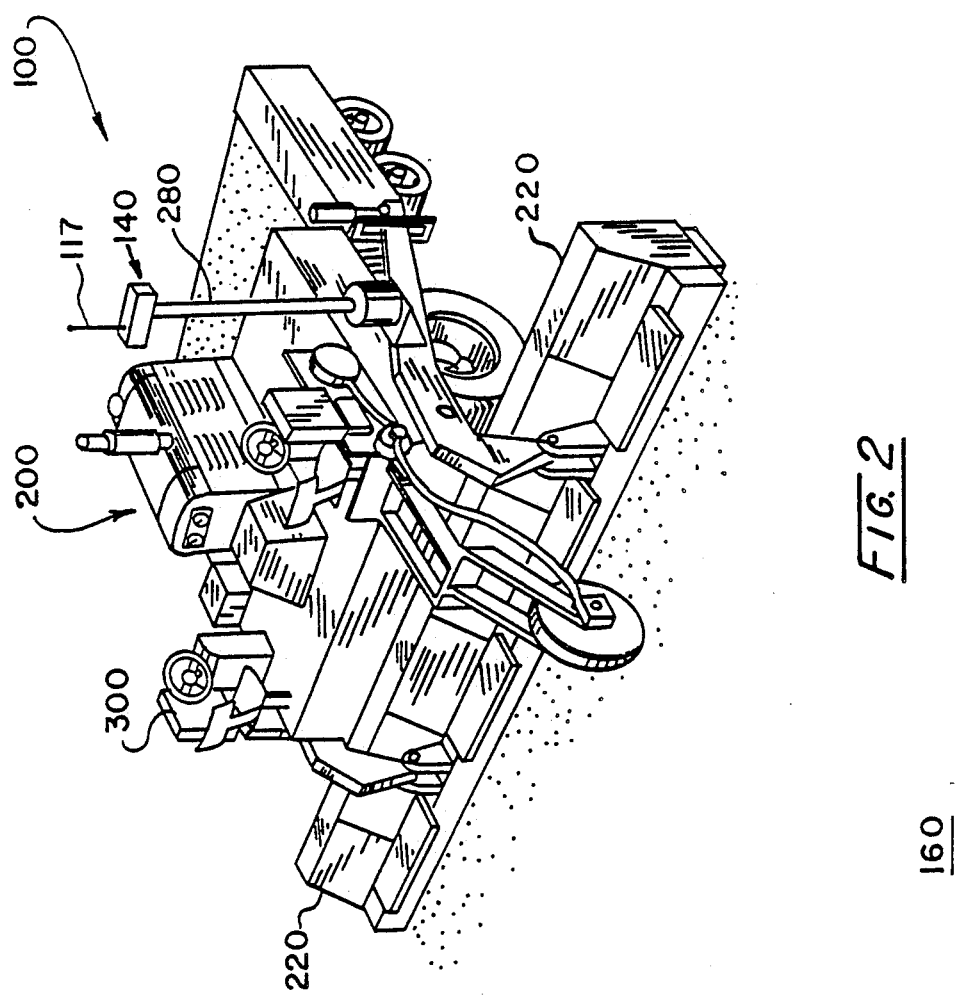
FIG. 2 is a pictorial view of a work site showing a stationary laser transmitter and a receiver mounted on a mobile paving machine, which transmitter and receiver comprise components of the laser-based position measurement system of the present invention.

FIGS. 1 and 2 of the drawings illustrate the arrangement of components of a laser-based three dimension position measurement system, generally designated 100, which operates in accordance with the principles of the present invention. The position measurement system 100 basically includes a laser transmitter 120 and a receiver 140. FIG. 1 is a diagrammatic representation of a work site 160 with the transmitter 120 and receiver 140 located therein at a distance R from one another, and with the receiver 140 being positioned at an angle a with respect to a reference X axis arbitrarily defined at the transmitter 120.

FIG. 2 shows the work site 160 with the laser transmitter 120 mounted on a tripod 180 and the receiver 140 mounted on a mast 280 of a mobile piece of construction equipment comprising a paving machine 200. The laser transmitter 120 is situated at a fixed reference point in the work site 160. The work site 160 might be a large parking lot, or air field, a construction site or other area which, for example, is to be paved. The paving machine 200 moves about the work site 160 depositing paving material at a thickness which will bring the top surface up to a desired grade. It can be appreciated that while such pavement is substantially level, it usually will be slightly contoured in order to properly channel run-off from rain storms. Such contouring is specified on a topographic plan as elevations at specified positions throughout the site 160. As will become apparent below, while the present invention is illustrated in use with a paving machine, it will have utility with a wide variety of construction equipment.

The paving machine 200 is equipped with a control system for automatically maintaining each end of a distributor 220 at a desired elevation with respect to a laser reference plane produced by the laser transmitter 120. Such a control system is described in U.S. Pat. No. 3,873,226 entitled "Laser Control System For Road Paving Machines," the disclosure of which is incorporated herein by reference, and it is responsive to signals produced by the receiver 140.

The control system described in U.S. Pat. No. 3,873,226 also raises and lowers the distributor 220 to maintain the top surface of the pavement at a desired elevation despite the unevenness of the ground on which the paving machine 200 operates. The control system operates in response to signals representing elevation, range R and angle a information generated by the receiver 140. This information may be displayed on an operator panel 300 located adjacent to the operator and may, if desired, be supplied to an automatic control system which raises and lowers the distributor 220 in order to maintain the top surface of the site at the desired grade. The way in which the elevation, range and angle data are generated is described below.

Figure 7:
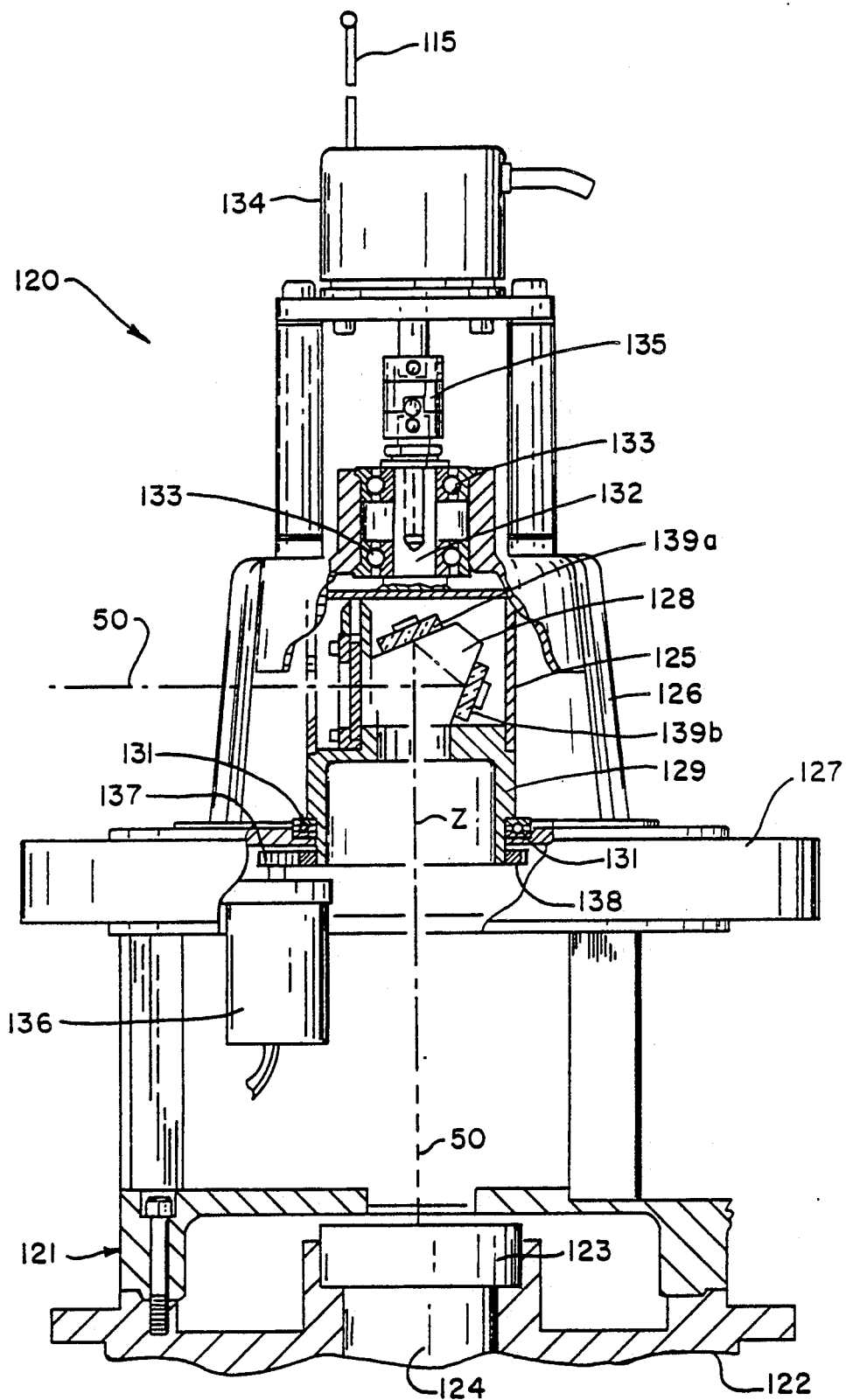
FIG. 7 is a partial view, with parts broken away and in section, of the laser transmitter employed in the measurement system of FIG. 2.

Still referring particularly to FIGS. 1 and 2, the laser transmitter 120 produces a laser beam 50 which is projected outward therefrom. This beam 50 is continuously rotated through 360 degrees at a substantially constant angular velocity such that it sweeps past the receiver 140 once during each revolution. The laser transmitter 120 also includes an angle encoder 134, as shown in FIG. 7, which produces a plurality of angle signals indicative of the angular position of the laser beam 50 with respect to the arbitrarily defined reference X axis. The angle signals may be transmitted to the receiver 140 by way of a radio transmitter or by modulating the laser beam 50. In response to the laser beam 50 and the angle signals the receiver 140 determines its elevation, its range R from the transmitter 120 and its angular position a. The three dimensional position of the paving machine 200 is thus established, and can be displayed or employed to control the elevation of the distributor 220 automatically.

Figure 3:
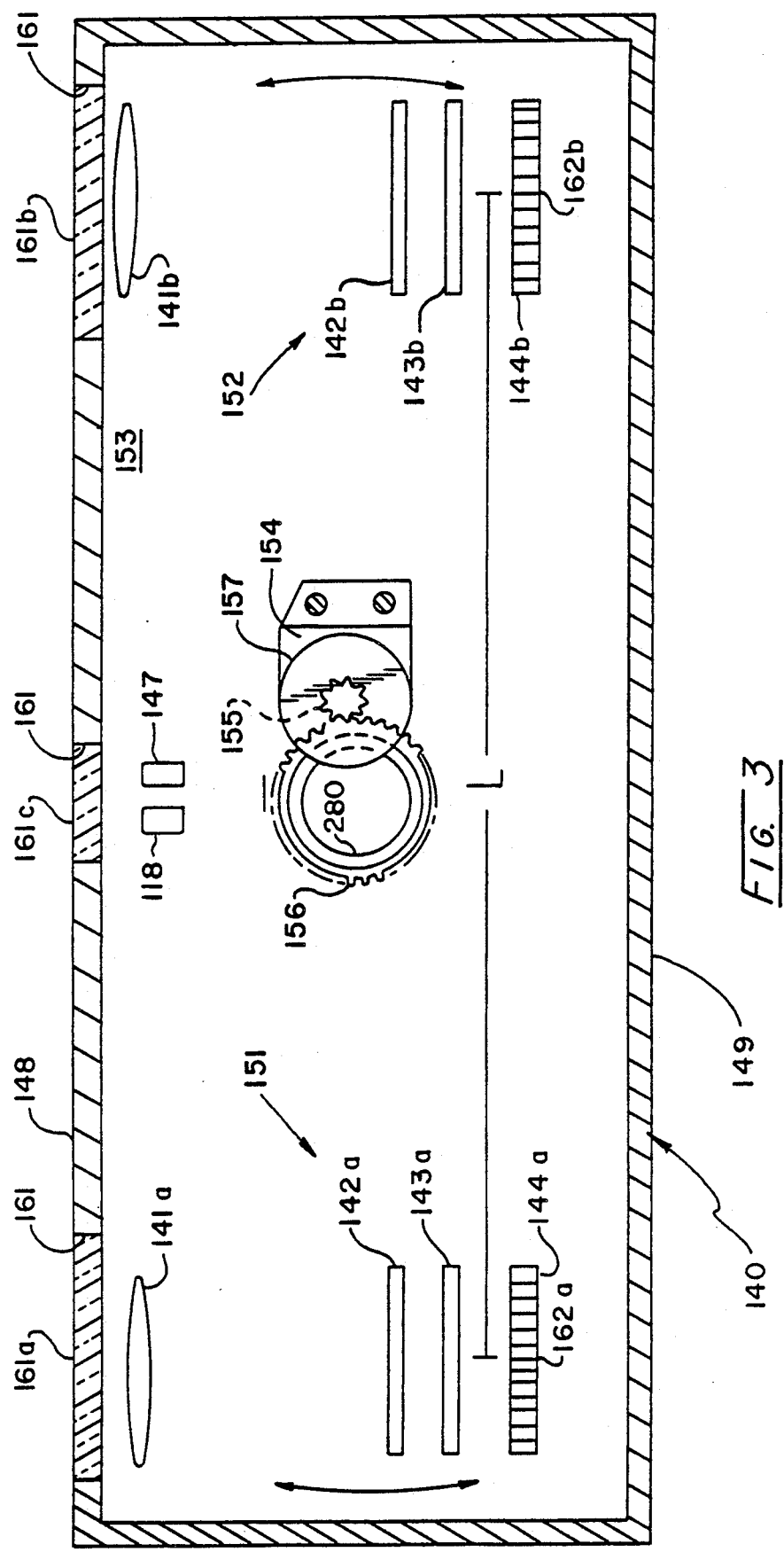
FIG. 3 is a schematic sectioned plan view of the receiver which forms part of the measurement system of the present invention.

Referring now to FIG. 3, there is shown the receiver 140 employed by the position measurement system 100 of the present invention. The receiver 140 includes a housing 149 which is weathertight and which provides protection for the optical and electrical components contained therein. The housing 149 is rotatably mounted to the mast 280 which extends upward through an opening in the bottom 153 of the housing 149. The housing 149 includes a face 148 having a plurality of openings 161 which are sealed by windows 161a–c through which the laser beam 50 is permitted to enter the receiver 140. Two laser beam detector devices 151 and 152, are mounted to a bottom wall 153 of the housing 149 and spaced apart on either side of mast 280.

Referring still to FIG. 3, an electric motor 157 is mounted to the housing 149 by a bracket 154. As will be described in more detail below, the electric motor 157 is operated to rotate a drive gear 155 in either direction in response to laser beam measurements made by the two laser beam detector devices 151 and 152. As the motor 157 is operated, the housing 149 is caused to rotate about mast 280 to direct its face 148 toward the transmitter 120.

Figure 4:
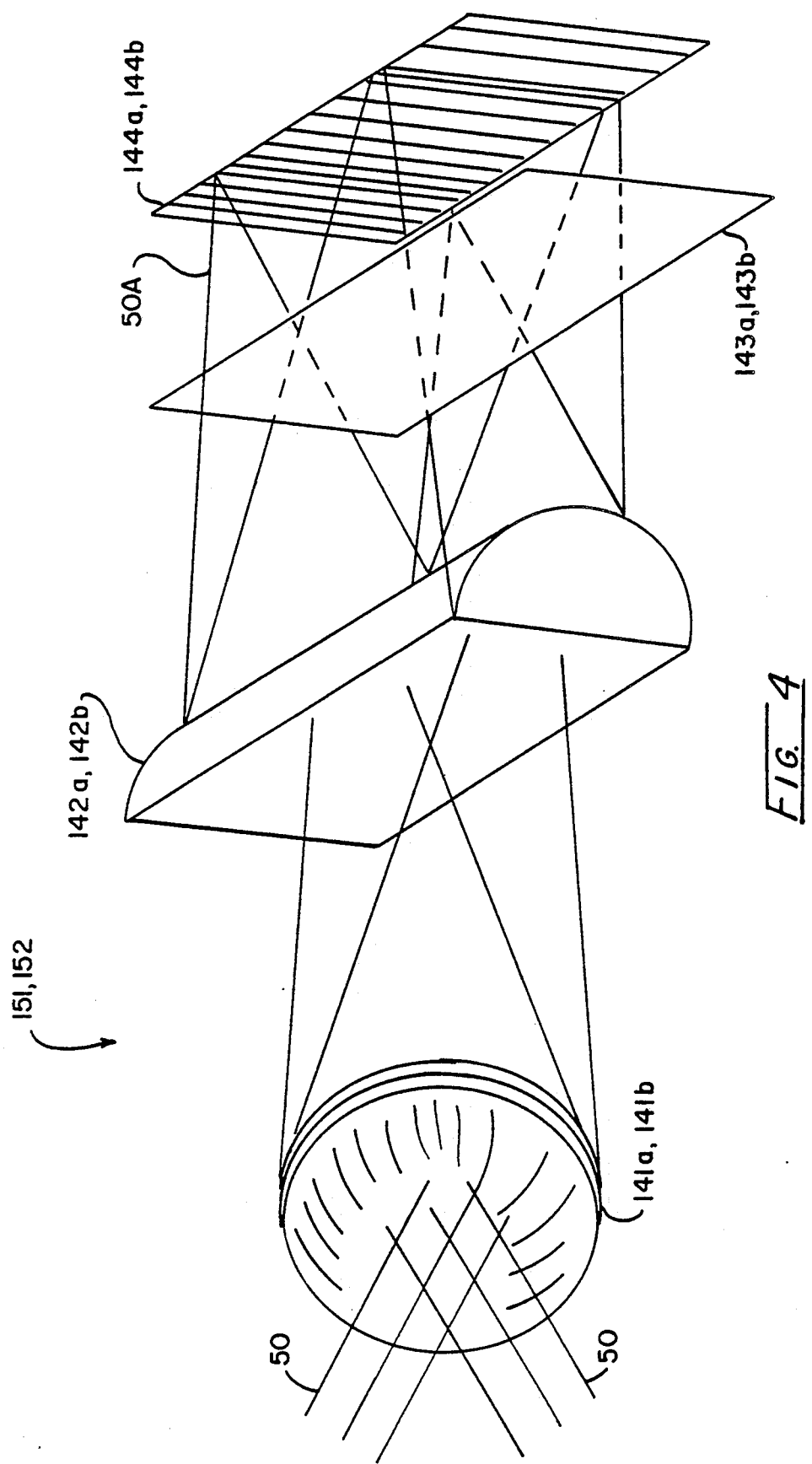
FIG. 4 is a schematic perspective view of laser beams passing through a laser beam detector device.

Looking at FIG. 3 in more detail, the two laser beam detector devices 151 and 152 each include a charged-coupled device (CCD) array 144a and 144b, respectively. Each laser beam detector device 151 and 152 also includes a lens 141a and 141b, respectively, for gathering and focusing the incoming laser beam 50 onto each of the two CCD arrays 144a and 144b. Located directly after each lens 141a and 141b is a cylindrical lens 142a and 142b. As shown in FIG. 4, each cylindrical lens 142a and 142b serves to fan the laser beam 50 out into a vertically extending laser beam plane 50A extending onto each respective CCD array 144a and 144b. This insures that the laser beam 50 will strike each CCD array 144a and 144b even though the laser beam 50 does not enter the receiver 140 horizontally. Each of the laser beam detector devices 151 and 152 also has a filter 143a and 143b, respectively, located after its cylindrical lens 142a and 142b. Each filter 143a and 143b is a band-pass light filter (e.g., 633–788 nm filter) which blocks extraneous light while allowing the laser beam 50 to pass therethrough onto one of the two CCD arrays 144a and 144b.

Figure 5A:
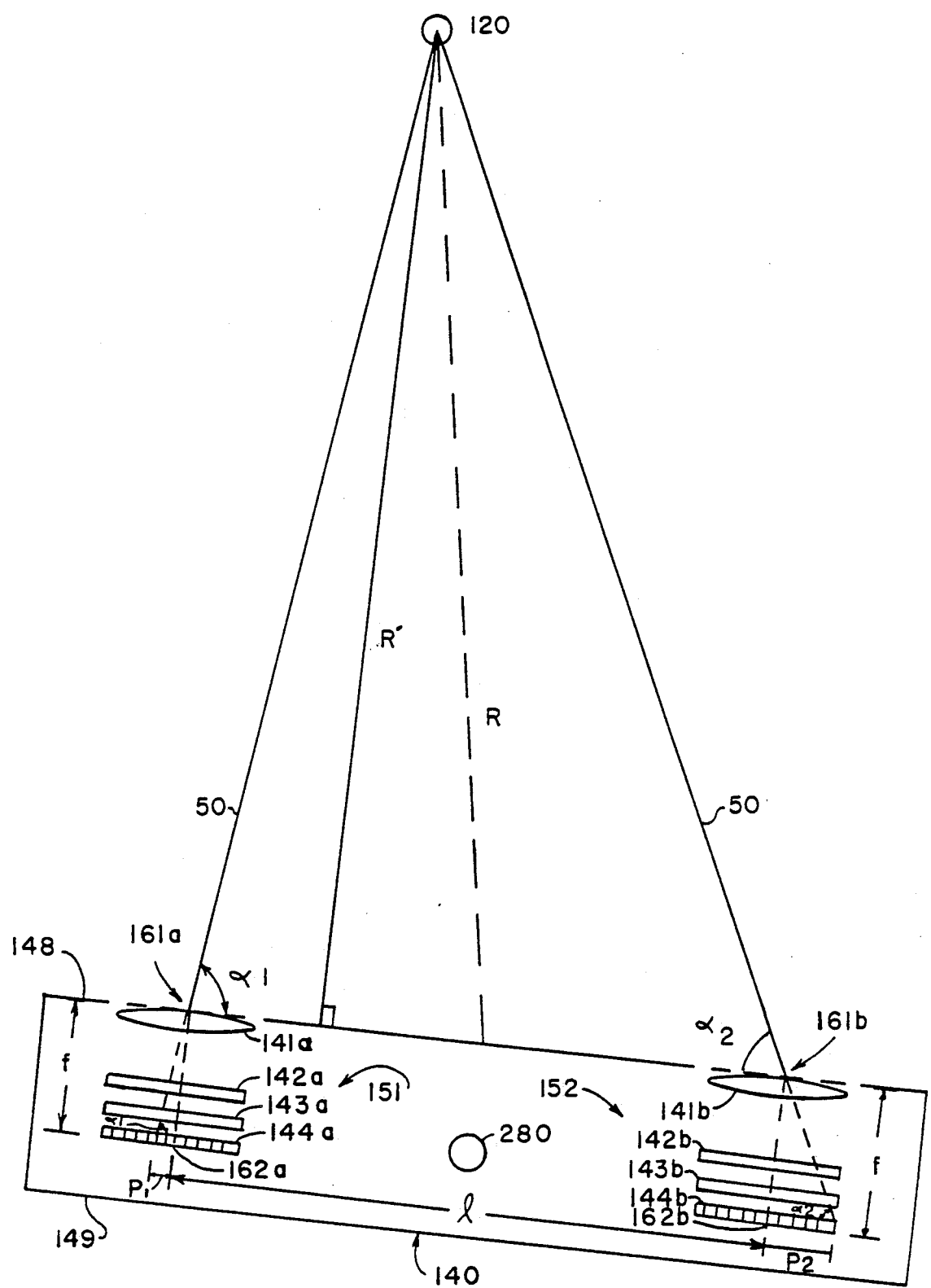
FIG. 5A is a schematic plan view of the receiver showing the horizontal angles of the laser beam striking the face of the receiver at two spaced apart locations on the face of the receiver.

Referring to FIG. 5A, it can be seen that the laser beam 50 is received by the receiver 140 through windows 161a and 161b which cover and protect the two laser beam detector devices 151 and 152. While entering detector device 151, the laser beam 50 strikes the face 148 of the receiver 140 at the first window 161a at a horizontal angle alpha-1 with respect to the face 148. While entering detector device 152, the laser beam 50 strikes the face 148 of the receiver 149 at the second window 161b at a horizontal angle alpha-2 with respect to the face 148.

The laser beam 50 first passes through lenses 141a and 141b which gather and focus the incoming laser beam 50 onto the CCD arrays 144a and 144b. After the laser beam 50 passes through lenses 141a and 141b, it passes through the cylindrical lenses 142a and 142b, as best shown in FIG. 4, where the laser beam 50 is fanned out into a vertically extending laser beam plane 50A extending onto each CCD array 144a and 144b. Before reaching the CCD arrays 144a and 144b, the laser beam 50 also passes through filters 143a and 143b which block extraneous light while allowing the laser beam 50 to pass therethrough onto each of the two CCD arrays 144a and 144b.

The CCD arrays 144a and 144b sense the positions or cells $P_1$ and $P_2$ which are illuminated by the laser beam 50. The illuminated cells $P_1$ and $P_2$ of the CCD arrays 144a and 144b are indicative of the horizontal angles alpha-1 and alpha-2 at which the laser beam 50 strikes the face 148 of the receiver 140. In response to laser illumination of the cells $P_1$ and $P_2$, the CCD arrays 144a and 144b generate corresponding position signals which are passed to a processor 158 which determines the range R of the receiver 140 from the transmitter 120 based upon the position signals. In order for the processor 158 to calculate the range R from the position signals, the processor 158 is programmed to solve the equation derived below.

Figure 5B:
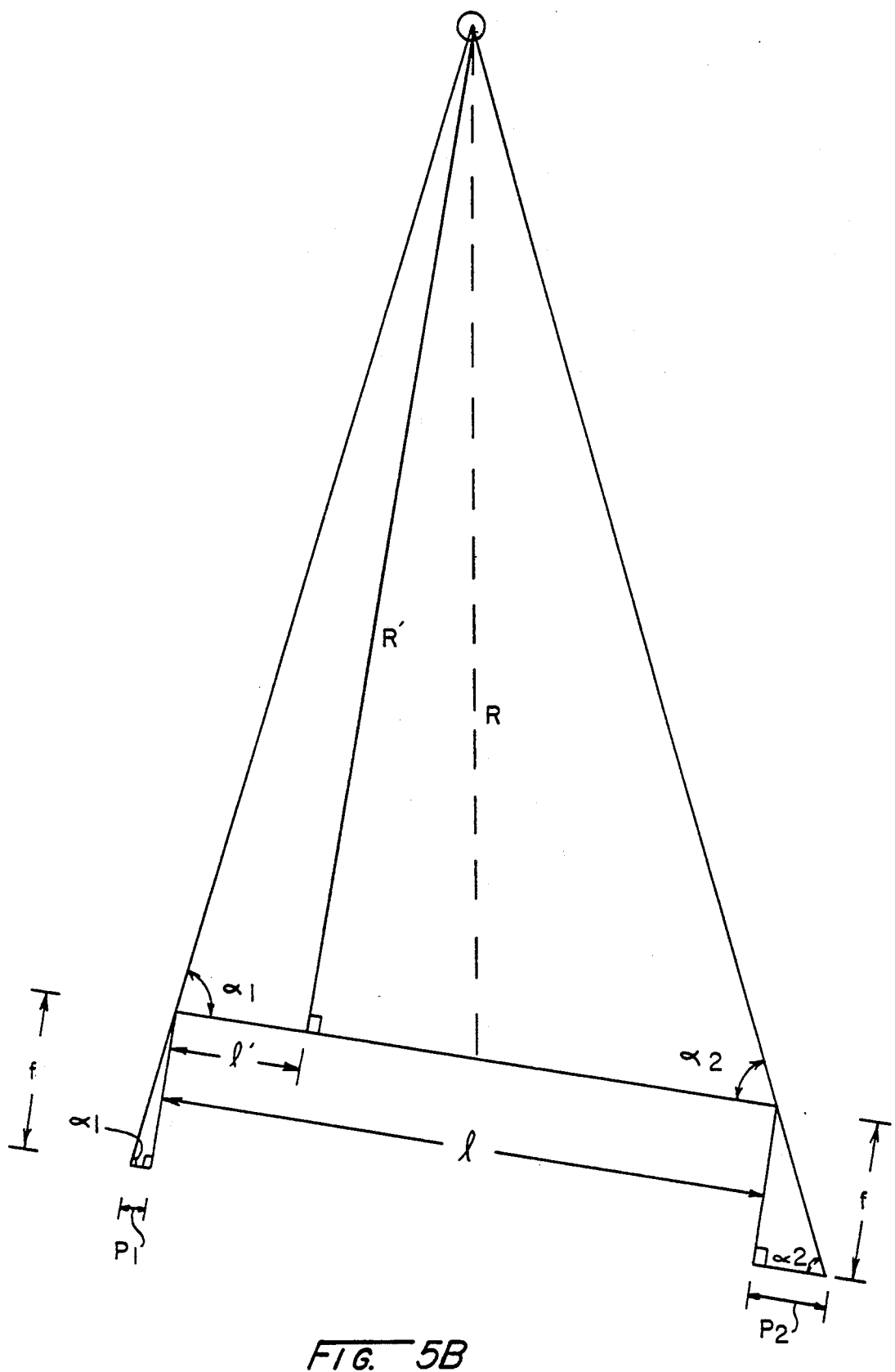
FIG. 5B is a graphical representation of the laser beams of FIG. 5A used to illustrate derivation of the equation used to calculate the range of the receiver from the transmitter.

Referring to FIG. 5B, it is apparent that:

$$\tan\alpha_1 = \frac{R'}{l'} \tag{1}$$

$$\tan\alpha_2 = \frac{R'}{l - l'} \tag{2}$$

$$l' = \frac{R'}{\tan\alpha_1} \tag{3}$$

$$R' = l\tan\alpha_2 - l'\tan\alpha_2 \tag{4}$$

where alpha-1 is equal to the first horizontal angle, alpha-2 is equal to the second horizontal angle, l is equal to the predetermined distance between reference points 162a and 162b on the CCD arrays 144a and 144b of the laser beam detector devices 151 and 152, respectively, and R' is the perpendicular distance from the transmitter 120 to the receiver 140 and l' is the distance from the center of the window 161a to where R' strikes the face 148 of the receiver 140. By substituting equation (3) into equation (4), one derives:

$$R' = l\tan\alpha_2 - \tan\alpha_2\left(\frac{R'}{\tan\alpha_1}\right) \tag{5}$$

By manipulating equation (5), it is apparent that:

$$R' = \frac{l\tan\alpha_1\tan\alpha_2}{\tan\alpha_1 + \tan\alpha_2} \tag{6}$$

By substituting equation (6) into equation (3), one derives:

$$l' = \frac{l\tan\alpha_2}{\tan\alpha_1 + \tan\alpha_2} \tag{7}$$

Referring to FIG. 5B, it is apparent that:

$$R^2 = R'^2 + \left(\frac{l}{2} - l'\right)^2 \tag{8}$$

where R is equal to the distance from the transmitter 120 to the center of the face 148 of the receiver 140, i.e., the range of the receiver 140 from the transmitter 120. By substituting equation (6) and equation (7) into equation (8) one derives:

$$R^2 = \frac{l^2\tan^2\alpha_1\tan^2\alpha_2}{(\tan\alpha_1 + \tan\alpha_2)^2} + \frac{l^2}{4} - \frac{l^2\tan\alpha_2}{\tan\alpha_1 - \tan\alpha_2} + \frac{l^2\tan^2\alpha_2}{(\tan\alpha_1 + \tan\alpha_2)^2} \tag{9}$$

By manipulating equation (9), one derives:

$$R^2 = \frac{l^2\tan^2\alpha_1\tan^2\alpha_2 + \tfrac{1}{4}l^2(\tan\alpha_1 - \tan\alpha_2)^2}{(\tan\alpha_1 + \tan\alpha_2)^2} \tag{10}$$

By taking the square root of both sides of equation (10), one derives:

$$R = \frac{l}{2} \frac{\sqrt{4\tan^2\alpha_1\tan^2\alpha_2 + (\tan\alpha_1 - \tan\alpha_2)^2}}{(\tan\alpha_1 + \tan\alpha_2)} \tag{11}$$

Referring once again to FIG. 5B, it is apparent that:

$$\tan\alpha 1 = f/P_1 \tag{12}$$

$$\tan\alpha 2 = f/P_2 \tag{13}$$

where $P_1$ and $P_2$ are the positions that the laser beam 50 strikes each CCD array 144a and 144b, respectively, and f is equal to the distance from each lens 141a and 141b to its respective CCD array 144a and 144b. By substituting equation (12) and equation (13) into equation (11), one derives:

$$R = \frac{l\sqrt{4f^2 + P_2^2 - 2P_1P_2 + P_1^2}}{2(P_1 + P_2)} \tag{14}$$

Equation (14) is programmed into the processor 158. Processors capable of performing the operations of this invention are well-known in the art. Thus, any one of a number of well-known processors may be used to perform the desired operations set forth herein. After equation (14) is programmed into processor 158, length l and focal length f are inputted into the processor 158. The processor 158, having equation 14 programmed therein, is then capable of repetitively calculating the range R of the receiver 140 from the transmitter 120 upon receiving the position signals representing illuminated positions $P_1$ and $P_2$ from CCD arrays 144a and 144b. The range R can then be employed to determine the three dimensional position of the paving machine 200.

The electric motor 153, as shown in FIG. 3, is operated to rotate receiver 140 in either direction to position the face 148 of the receiver 140 toward the transmitter 120. The processor 158 controls the movement of the electric motor 153 in order to direct the face 148 of the receiver 140 toward the transmitter 120. The processor 158, for example, may receive the position signals representing positions $P_1$ and $P_2$ from CCD arrays 144a and 144b and control the movement of motor 153 based upon these values.

The face 148 of the receiver 140 will be directed toward transmitter 120 if angles alpha-1 and alpha-2 are substantially equal to one another. Since the position signals representing positions $P_1$ and $P_2$ are indicative of angles alpha-1 and alpha-2, processor 158 will compare the values of the position signals and if they are not substantially equal to one another, processor 158 will send a correcting signal to the motor 153. The correcting signal will direct the motor 153 to rotate the receiver 140 in a direction to more directly face the transmitter 120 so that the position signals will become substantially equal to one another.

Looking at FIG. 5A, since alpha-1 is greater then alpha-2, the processor 158 will send a correcting signal to motor 153 instructing it to turn the receiver 140 in a counter-clockwise direction. The receiver 140 will be turned in this direction until the position signals are substantially equal to one another. When this occurs, alpha-1 and alpha-2 will also be substantially equal to one another and the face 148 of the receiver 140 will be directed toward the laser beam 50.

Figure 6:
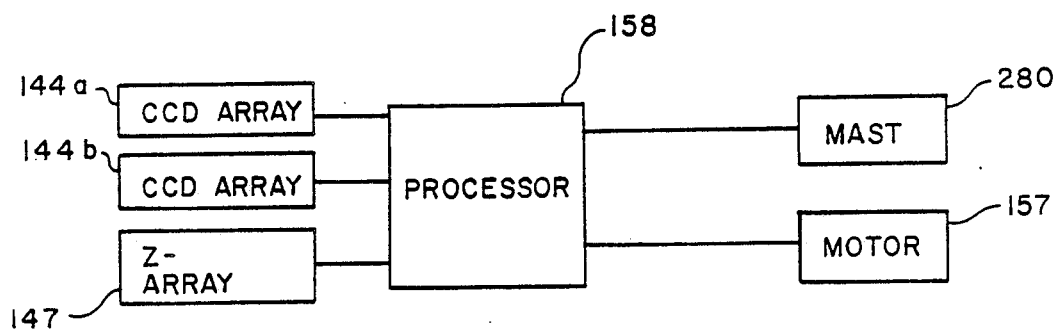
FIG. 6 is a block diagram of a circuit for use with the receiver of the present invention.

To control the height of the receiver 140, the laser beam 50 from the transmitter 120 also impinges upon a vertical position sensor 147, as shown in FIG. 3. The vertical position sensor 147 may be a Z-photocell array as discussed in co-pending U.S. patent application Ser. No. 234,565, the disclosure of which is incorporated herein by reference. As shown in FIGS. 3 and 6, the Z-photocell array senses the vertical position of the receiver 140 with respect to the rotating laser beam 50 and sends a signal representing this position to the processor 158. The processor 158 then sends a signal to the mast 280 to adjust the height of the mast 280 in order to insure that the receiver 140 receives the laser beam 50. This information may be displayed on an operator panel 300 located adjacent to the operator and may, if desired, be supplied to an automatic control system which raises and lowers the distributor 220 in order to maintain the top surface of the site 116 at the desired grade.

Alternatively, the height of the receiver 140 may be controlled as set forth in U.S. Pat. No. 4,830,489, the disclosure of which is incorporated herein by reference. The height of the receiver in U.S. Pat. No. 4,830,489, is controlled using two triangular photodetectors (not shown herein). The two triangular photodetectors are positioned so that one photodetector is positioned above the other photodetector. When the receiver 140 is below the laser beam 50, more of the energy from the laser beam 50 impinges on the upper photodetector and it produces more current than the lower photodetector. This difference is employed to produce a control signal which raises the mast 280 back into alignment with the laser beam 50. The information produced by the triangular photodetectors may also be displayed or employed to control the elevation of the distributor 220 as set forth in U.S. Pat. No. 4,830,489.

Referring to FIG. 7, the transmitter 120 includes a housing 121 having a gimbal frame 122 which supports a laser beam projector 123. The laser beam projector 123 includes a tubular body 124 which extends downward into housing 121 and a laser diode (not shown) which is mounted at its lower end. The laser diode produces a low-power output beam 50 in the infrared or visible band of the light spectrum. Optics are provided at the top of the tubular body 124 for projecting the laser beam 50 upward along the Z-axis. This output is indicated at 50 in FIG. 7.

The laser beam 50 passes upwardly through the optics of the tubular body 124 into a pentaprism reflecting head 125. The head 125 projects the laser beam at 50 radially outward along a generally horizontal path a lighthouse structure 126 mounted on top of a plate 127 which is also attached to the gimbal frame 122. The reflecting head 125 comprises a pentareflector assembly 128 mounted on a platform 129 which is supported for rotation about the Z-axis by bearings 131, a shaft 132 and bearings 133. A shaft angle encoder 134 is mounted on the top of the lighthouse structure 126 and is also connected to the shaft 132 by means of a coupling 135. The pentaprism reflecting head 125 is rotated at a substantially constant angular velocity by an electric motor 136, which is coupled to the platform 129 by means of pulleys 137 and 138 and a drive belt (not shown) extending therearound.

The pentareflector assembly 128 includes a pair of mirrors 139a and 139b which are precisely mounted to reflect the laser beam a total of ninety degrees. As the pentaprism reflecting head 125 rotates, the laser beam 50 is swept through 360 degrees to define a horizontal reference plane that extends radially outward in all directions from the laser transmitter 120. The shaft angle encoder 134 provides a digital indication of the angular orientation of the beam 50 with respect to the reference axis X, see FIGS. 1 and 2.

The laser beam transmitter 120 described thus far is similar to the laser beam transmitter in cross referenced U.S. patent application, Ser. No. 234,565. The transmitter 120 required to implement the preferred embodiment of the present invention is a modified version of this device. As set forth above, the shaft angle encoder 134 provides a digital indication of the angular orientation of the laser beam 50 with respect to the reference axis X. These same signals indicative of the angular orientation of the laser beam 50 will be sent to the receiver 140, as discussed below, to determine the azimuth measurement, as represented in FIGS. 1 and 2 by the angle a, of the position of the receiver 140 from a reference axis X.

Figure 8:
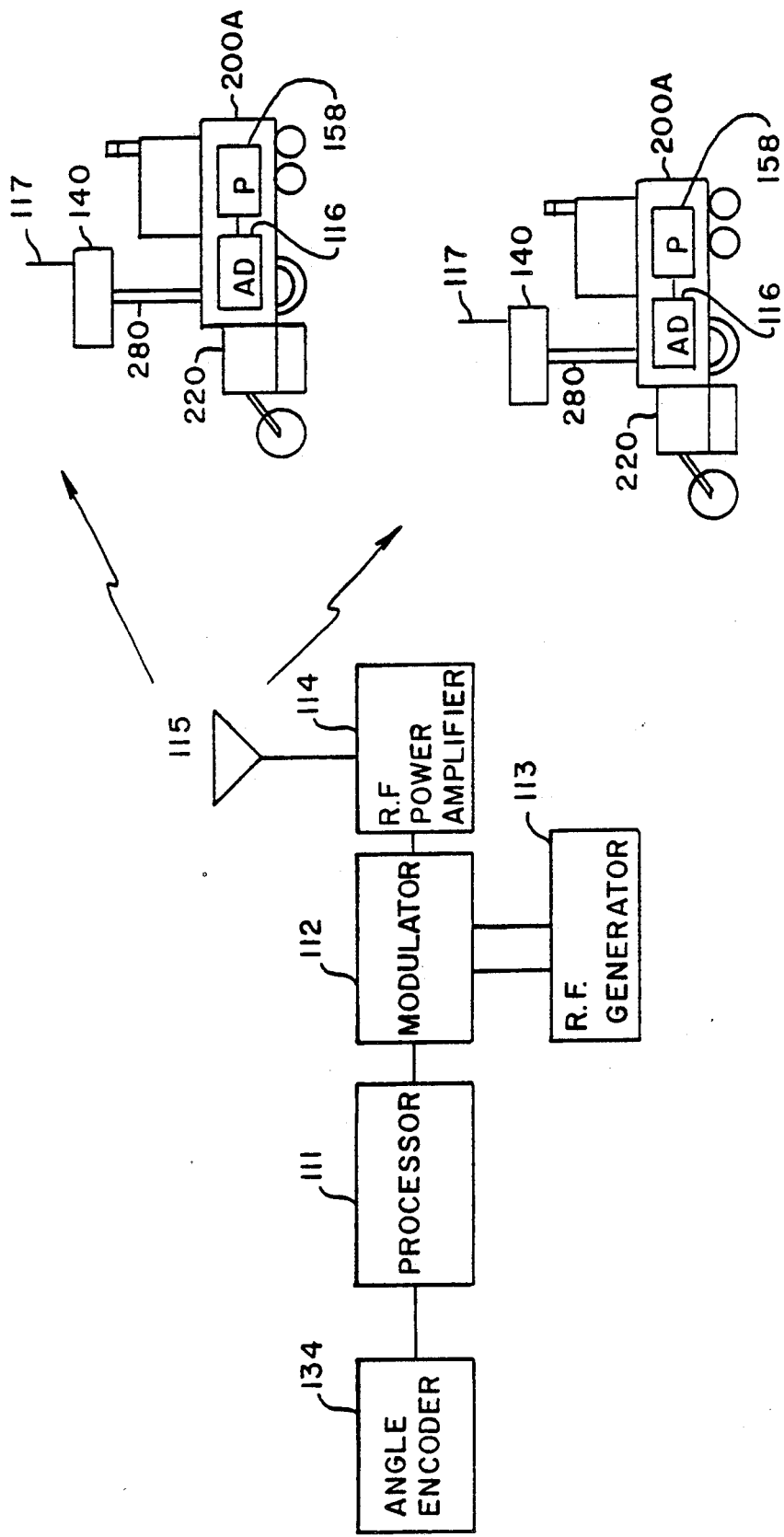
FIGS. 8 and 9 are schematic block diagrams illustrating the azimuth measurement system of the present invention.

Referring now to FIG. 8, the manner in which the azimuth angle a of the position of the receiver 140 is determined will be explained. The signals produced by angle encoder 134 indicating the angular orientation of the laser beam 50 relative to the reference axis X define the azimuth angle a of the position of the receiver 140 at the time when the laser beam is sensed by the receiver 140. These signals, each of which represent a specific angle a, are sent by the angle encoder 134 to a processor 111. In response to the angle signals received from the angle encoder 134, the processor 111 controls a radio frequency (RF) modulator 112 to modulate an RF carrier signal received from an RF generator 113. A number of modulation schemes are known in the art such as pulse width modulation which is well suited for encoding the angle signals. In any event, the modulator 112 generates a modulated RF signal in a known manner bearing information representative of the angle signals. The modulated RF signal is amplified by an RF power amplifier 114 and coupled to an antenna 115 to propagate the modulated RF signal throughout the work site where it can be detected by one or more receivers 140.

As shown in FIG. 8, the modulated RF signal representative of the angle signals generated by the angle encoder 134 may be received by one or more RF receivers 140 on one or more pieces of equipment 200A. Each receiver 140 can receive the modulated RF signal via an antenna 117 which is coupled to an angle decoder 116. The angle decoder 116 converts the modulated RF signal back into angle signals indicative of the azimuth angle a of the receiver 140. The angle decoder 116 is coupled to a processor 158 associated with the receiver 140. Upon sensing the laser beam 50, the processor 158 locks in the angle signal then being received. The locked in angle signal represents the azimuth angle a of the position of the receiver 140 from the reference axis X.

Thus, knowing the azimuth angle a of the receiver 140, the vertical position of the receiver 140 and the range of the receiver 140 from the transmitter 120, the three dimensional position of the paving machine is established and can be displayed or employed to control the elevation of the distributor 220.

Figure 9:
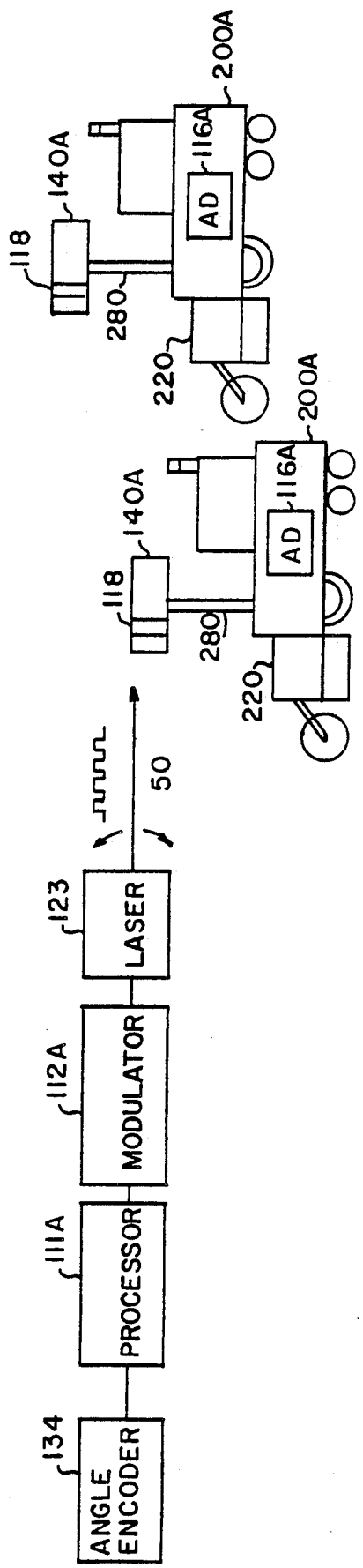

As an alternative to the radio frequency transmission dePicted in FIG. 8, the laser beam 50 may be modulated directly to send the angle signals generated by the angle encoder 134 to the receivers 140a, as shown in FIG. 9. Angle encoder 134 sends its angle signals, each of which represents a specific angle a, to a processor 111a. The processor 111a controls a modulator 112a which modulates the laser beam 50 thereby sending the angle signals over the laser beam 50 itself.

The laser sensors used for the determination of the range R and vertical positioning of machines in the work site can be used to receive a modulated laser beam signal. If necessary or desireable, the receivers 140a may include a separate photosensor 118, as shown in FIGS. 3 and 9, for sensing the modulated laser beam 50. In any event, a signal representing the sensed modulated laser beam is passed to its respective angle decoder 116a. The angle decoder 116a converts this signal into an angle signal representing the azimuth angle a of the receiver 140a. Knowing the azimuth angle a of the receiver 140a, the three dimensional position of the paving machine can thus be established and can be displayed or employed to control the elevation of the distributor 220.

Having thus described the laser beam measurement system of the present invention in detail and by reference to preferred embodiments thereof, it will be apparent that modifications and variations are possible without departing from the scope of the invention defined in the appended claims.

What is claimed is:

1. A laser beam measurement system comprising:
first transmitter means located at a first position for producing a laser reference plane by sweeping a laser beam about said first transmitter means; and
first receiver means located at a second position and having a face for receiving said sweeping laser beam, said first receiver means including two spaced apart laser beam detector means for measuring the horizontal angle of the incoming beam with respect to the face of said first receiver means at two spaced apart locations on the face of said first receiver means, said horizontal angle measurements being indicative of the range of said first receiver means from said first transmitter means.

2. A laser beam measurement system as claimed in claim 1, wherein said first transmitter means includes azimuth means for continuously transmitting angle signals indicative of an azimuth angle at which said first receiver means is positioned with respect to a reference axis that extends from said first transmitter means.

3. A laser beam measurement system as claimed in claim 1, wherein each of said laser beam detector means comprises:
light detecting array means for determining the position of said laser beam as said laser beam strikes said light detecting array means and thereby providing an indication of the measurement of the horizontal angle of the laser beam with respect to the face of said first receiver means;
first lens means for gathering and focusing the laser beam onto said light detecting array means; and
cylindrical lens means for converting the laser beam passing through said first lens means into a laser beam plane extending vertically onto said light detecting array means.

4. A laser beam measurement system as claimed in claim 3, wherein each of said laser beam detector means further includes filtering means for blocking extraneous light while allowing said laser beam to pass therethrough.

5. A laser beam measurement system as claimed in claim 3, wherein said light detecting array means comprises a charge-coupled device (CCD) array.

6. A laser beam measurement system as claimed in claim 1, wherein said first receiver means further includes height sensing means for sensing the vertical position of said first receiver means with respect to said reference plane.

7. A laser beam measurement system as claimed in claim 2, wherein said azimuth means comprises angle encoder means for generating said angle signals and said first receiver means includes angle decoder means for receiving said angle signals to determine said azimuth angle.

8. A laser beam measurement system as claimed in claim 2, wherein said azimuth means comprises a radio transmitter for transmitting said angle signals to said first receiver means.

9. A laser beam measurement system as claimed in claim 2, wherein said azimuth means comprises means for modulating said laser beam to transmit said angle signals by way of said laser beam to said first receiver means.

10. A laser beam measurement system as claimed in claim 1, wherein said first receiver means further includes orientation means for maintaining said first receiver means in proper orientation with respect to said first transmitter means.

11. A laser beam measurement system as claimed in claim 10, wherein said orientation means employs said angle measurements from each of said laser beam detector means for determining the orientation of said first receiver means and thereby directing the face of said first receiver means toward said first transmitter means.

12. A laser beam measurement system comprising:
transmitter means located at a first position for producing a predetermined laser reference plane by sweeping a laser beam about said transmitter means;
receiver means located at a second position having a face for receiving said sweeping laser beam, said receiver means including two laser beam detector means spaced apart by a predetermined distance for measuring the horizontal angle of the incoming beam with respect to the face of said receiver means at two spaced apart locations on the face of said receiver means; and
processor means for determining the range of said receiver means from said transmitter means in response to the angle measurements from each of said laser beam detector means and the predetermined distance between said two spaced apart laser beam detector means.

13. A laser beam measurement system as claimed in claim 12, wherein each of said laser beam detector means comprises:
light detecting array means for determining the position of said laser beam as said laser beam strikes said light detecting array means and thereby providing an indication of the measurement of the horizontal angle of the laser beam with respect to the face of said first receiver means;
first lens means for gathering and focusing the laser beam onto said light detecting means; and
cylindrical lens means for converting the laser beam passing through said first lens means into a laser beam plane vertically extending onto said light detecting array means.

14. A laser beam measurement system as claimed in claim 13, wherein each of said laser beam detector means further includes filtering means for blocking extraneous light while allowing said laser beam to pass therethrough.

15. A laser beam measurement system as claimed in claim 13, wherein said light detecting array means comprises a charge-coupled device (CCD) array.

16. A laser beam measurement system as claimed in claim 13, wherein said processor means calculates the range of said receiver means from said transmitter means by repetitively solving the following equation:

$$R = \frac{l\sqrt{4f^2 + P_2^2 - 2P_1P_2 + P_1^2}}{2(P_1 + P_2)}$$

wherein R is the range of said receiver means from said transmitter means, l is said predetermined distance between said two spaced apart laser beam detector means, f is the distance between said first lens and said light detecting array means, $P_1$ is the position where said laser beam strikes the light detecting array means of one of said two laser beam detector means and $P_2$ is the position where said laser beam strikes the light detecting array means of the other of said two laser beam detector means.

17. A laser beam measurement system comprising:
first transmitter means located at a first position for producing a laser reference plane by sweeping a laser beam about said first transmitter means;
first receiver means located at a second position and having a face for receiving said sweeping laser beam, said first receiver means including two spaced apart laser beam detector means for measuring the horizontal angle of the incoming beam with respect to the face of said first receiver means at two spaced apart locations on the face of said first receiver means, said horizontal angle measurements being indicative of the range of said first receiver means from said first transmitter means;
said first transmitter means includes azimuth means for continuously transmitting angle signals indicative of an azimuth angle at which said first receiver means is positioned with respect to a reference axis that extends from said first transmitter means; and
height sensing means for determining the vertical position of said system relative to said reference plane.

18. A laser beam measurement system as claimed in claim 17, wherein each of said laser beam detector means comprises:
light detecting array means for determining the position of said laser beam as said laser beam strikes said light detecting array means and thereby providing an indication of the measurement of the horizontal angle of the laser beam with respect to said face of said first receiver means;
first lens means for gathering and focusing the laser beam onto said light detecting array means; and
cylindrical lens means for converting the laser beam passing through said first lens means into a vertically extending laser beam plane extending onto said light detecting array means.

19. A laser beam measurement system as claimed in claim 18, wherein each of said laser beam detector means further includes filtering means for blocking extraneous light while allowing said laser beam to pass therethrough.

20. A laser beam measurement system as claimed in claim 18, wherein said light detecting array means comprises a charge-coupled device (CCD) array.

* * * * *